Oct. 29, 1940.  H. C. BENZIN  2,219,677
LIQUID FLOW INDICATOR
Filed March 20, 1939
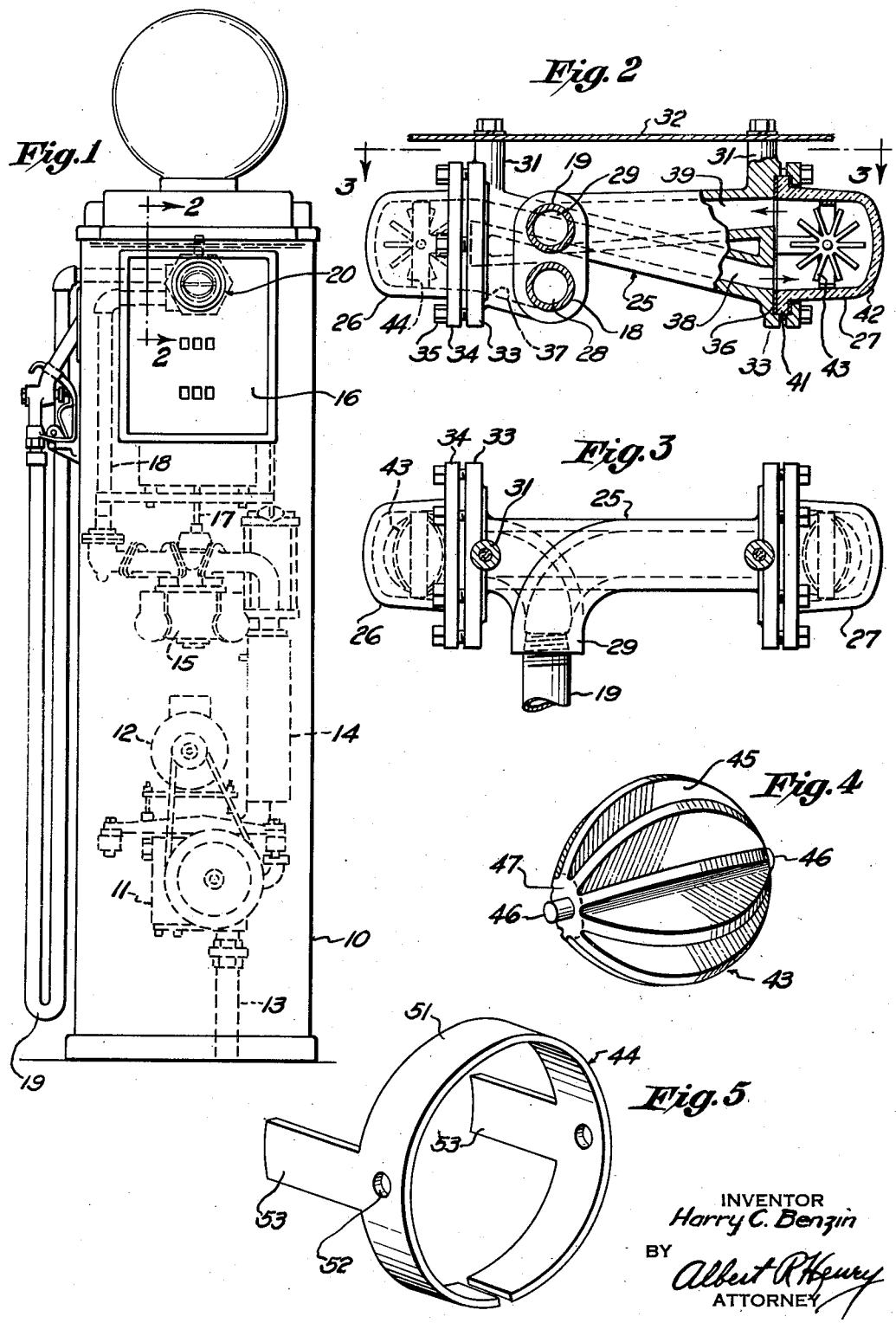
INVENTOR
Harry C. Benzin
BY
Albert R Henry
ATTORNEY Patented Oct. 29, 1940

2,219,677

UNITED STATES PATENT OFFICE 2,219,677

LIQUID FLOW INDICATOR

Harry C. Benzin, Buffalo, N. Y., assignor, by mesne assignments, to Martin & Schwartz, Inc., a corporation of Maryland Application March 20, 1939, Serial No. 263,071

3 Claims. (Cl. 116—117)

This invention relates to liquid flow indicators, and it has particular reference to the provision of a flow indicator for gasoline dispensing equipment which is effective at low rates of flow and which is readily discernible.

In the usual type of gasoline dispensing apparatus, there is provided a motor driven pump which lifts the gasoline from the reservoir and discharges it through the flow meter and into the dispensing hose. In order to determine whether the meter is operating properly, it is customary to make a portion of the liquid discharge line out of glass, and to put some kind of spinner or fluid actuated device in it. The theory is, of course, that the attendant, or the purchaser, can thereby ascertain whether or not gasoline is actually flowing when the meter register is operating, and whether there is any air in the system.

While these sight-glasses, or visible flow indicators, are relatively simple in nature, considerable difficulty has been experienced in procuring a device which is at once simple and inexpensive, but which will operate at low rates of flow, and which will also be readily discernible. Many indicators which have been proposed heretofore require flows of several gallons per minute before they become operative, although the meter may record flows of less than a gallon per minute. Other indicators are not readily discernible from the distance of the driver's seat from the dispenser, and therefore the purchaser may be unable to determine whether he is receiving any gasoline at all.

By the present invention, however, there is provided a very inexpensive flow indicator, of unique design, which has been found to operate satisfactorily at very low flow rates, and which produces such an effect in its movement as to arrest the attention of the attendant or purchaser, and thereby perform its intended function of disclosing the operation of the apparatus.

In general, these results are obtained by providing a flow indicator comprising a glass receiver having a flow-responsive element therein, which element is in the form of a sphere formed of a plurality of circular blades or vanes. It has been discovered that when such an element is placed in the fluid stream, it will revolve at very low flow rates, and will induce an optical effect which is pronounced.

A preferred form of the invention is illustrated in the accompanying drawing, wherein:

Fig. 1 is an elevation of a typical dispensing apparatus incorporating the novel flow indicator;

Fig. 2 is a side elevation, partially in section, of the improved indicator on an enlarged scale;

Fig. 3 is a plan view of the device shown in Fig. 2;

Fig. 4 is a perspective of the novel flow-responsive element; and

Fig. 5 is a perspective of the mounting ring for the rotor.

Referring first to Fig. 1, there is illustrated a gasoline dispenser comprising a casing 10 in which is mounted a pump 11, driven by a motor 12, for lifting gasoline through a suction pipe 13 from an underground reservoir (not shown), and discharging it into an air separator 14. The purpose of this unit is to remove from the gasoline the air which is invariably entrained in it, since the air would actuate the meter, and thus lead to a false reading of the amount of liquid delivered.

Gasoline delivered into the separator 14 flows into and through a flow meter 15, to operate the movable elements thereof in proportion to the quantity of liquid dispensed, and the meter in turn operates a registering device 16 through the medium of a connecting shaft 17. The gasoline flows from the meter through a discharge pipe 18, into and through the improved flow indicator 20, and thence into the dispensing hose 19 and its appended manually controlled nozzle. Except for the flow indicator 20, all of the foregoing parts and combinations are well known.

The flow indicator, generally designated by the reference numeral 20 in Fig. 1, is shown in greater detail in Figs. 2 and 3 as comprising a main casing 25 and a pair of glass cups 26 and 27 which are disposed at each end of the casing, and which are visible through the face of the dispenser casing 10. The pipe line 18, which leads from the meter 15, is connected to the casing 25 through a spud 28, while the hose line 19 is also connected to the casing 25 through a spud 29. All liquid and any air passing the meter flows through the indicator 20 on its way to the dispensing nozzle, and thus any air which has not been eliminated may be seen through the glass housings 26 and 27, and the fact of liquid flow may also be determined by looking through them.

The casing 25 may be in the form of a casting formed with a pair of bosses 31 which are tapped to permit the suspension of the unit from a plate 32 forming a part of the main casing 10. Each end of the casting is formed with a pad 33 for the reception of the glass cups 26 and 27, which are held in place by encircling rings 34 and bolts 35. Leakage is prevented by the interposition of gaskets 36. The casting 25 is internally cored to provide a passage 37 from the inlet spud 28 to the lower portion of the cup 26, a second passage 38 from the top of the cup 26 to the bottom of the cup 27, and a third passage 39 from the top of the cup 27 to the outlet spud 29. It will thus be seen that the liquid flows through both cups, entering at the bottom and leaving at the top, and the action is therefore the same on opposite sides of the dispenser casing.

The glass cups 26 and 27 are both the same, and are formed with shoulders 41 for engagement by the rings 34, and with convex bottoms or faces 42 to produce a magnifying effect. Each cup contains a spinner 43, whose details are shown more clearly in Fig. 4.

The spinner 43 is in the form of a sphere of uniformly spaced circular plates 45, so that, in geometrical shape, it resembles the framework of an orange from which the skin and pulp has been removed. Trunnions 46 are formed at each end of the common axis of the intersecting circular plates, and the sphere may be slightly flattened at these regions, as indicated by the reference numeral 47. The spinner may either be made by assembling a number of separate plates, or by a molding operation from a suitable plastic material, and the latter procedure is preferable as it provides a light, well balanced, and impervious article. Attention is invited to the fact that the zones on one side of the oblate axis are colored to contrast with the merging zones on the other side, and then, several plates farther around the sphere, the colors may be reversed. This color work, which is obtainable when forming the spinner in the stated shape, produces a flashing and almost kaleidoscopic optical effect when the spinner is revolved by the liquid stream, thus arresting the attention of the observer.

The spinner is mounted in the glass cup by means of a split ring 44 consisting of a circular band 51 formed with aligned bearing apertures 52 for the reception of the trunnions 46 and with side pieces 53 which facilitate insertion and removal, and which assist in maintaining the spinner in proper alignment. The spinner 43 is first assembled in the ring 44, and the assembly is then pressed into the cup 26 or 27 in such fashion that trunnions 46 are on a horizontal axis.

The stream of liquid flowing through the unit from the inlet 28 to the outlet 29 thus impinges each spinner 43 on the back and under side of the blades 45, thus causing rotation and the development of the stated color effect, which is the more readily observed by virtue of the magnifying effect of the glass ends 42. Since the spinner has a large number of vanes, and since it may be made of such size as to fill a substantial portion of the cup, the spinner operates readily under the lowest rates of flow, thus reflecting the condition of the equipment at all times during the dispensing operation.

It will, of course, be apparent to those skilled in the art that while the invention has been described with respect to a specific embodiment, various modifications and changes are permissible, and it is intended to cover all of them which fall within the scope of the following claims.

I claim:

1. A sight glass for liquid dispensing equipment comprising a glass cup having a surface visible from the exterior of the equipment, means for admitting liquid into and out of said cup, and a spinner mounted in the cup for rotation by liquid flowing therethrough, said spinner including a mounting ring disposed in said cup, said ring being formed with aligned bearing apertures, and a spherical member formed of a plurality of intersecting circular vanes all having a common axis of rotation, said member being provided with trunnions at opposite sides on said axis for engagement in said bearing apertures.

2. A sight glass assembly for liquid dispensing apparatus of the type wherein means are provided for forcing liquid from a reservoir to and through a dispensing hose, and wherein the sight glass assembly is adapted to be disposed in the path of flow, comprising, a casing member having pad means thereon, spaced liquid inlet and outlet passages communicating with said pad means, a glass cup having a curved end wall and an open end, said open end being secured to said pad means to connect said passages through said cup, and a flow responsive member mounted wholly within said cup, said member consisting of a plurality of intersecting substantially circular plates having a common axis, complementary means within the cup and on said flow responsive member for rotatably mounting the flow responsive member on said axis with said axis disposed transversely of the hydraulic path of liquid adapted to flow through the cup, said flow responsive member occupying substantially all of the volume of the cup.

3. A sight glass assembly for liquid dispensing apparatus, comprising a liquid flow casing formed with spaced inlet and outlet ports, said casing being of elongated form and having axially aligned ring-shaped pads at the extremities thereof, said extremities being spaced from said inlet and outlet ports, glass cups each having a visible curved end and an open end which is secured over a pad, said casing having a liquid passage in open communication between said inlet port and one of said cups, a second liquid passage in said casing spaced from the first named passage and having open communication between said cup and the other of said cups, a third liquid passage in said casing having open fluid communication between the other of said cups and said outlet port, said third named passage being spaced from said other passages, thereby providing a hydraulic path from the inlet to one cup, through said cup to the other cup, and thence to the outlet, hydraulically energized spinners each mounted wholly within a cup and visible therethrough, said spinners being rotatably mounted transversely of the flow path through said cups.

HARRY C. BENZIN.